UNITED STATES PATENT OFFICE.

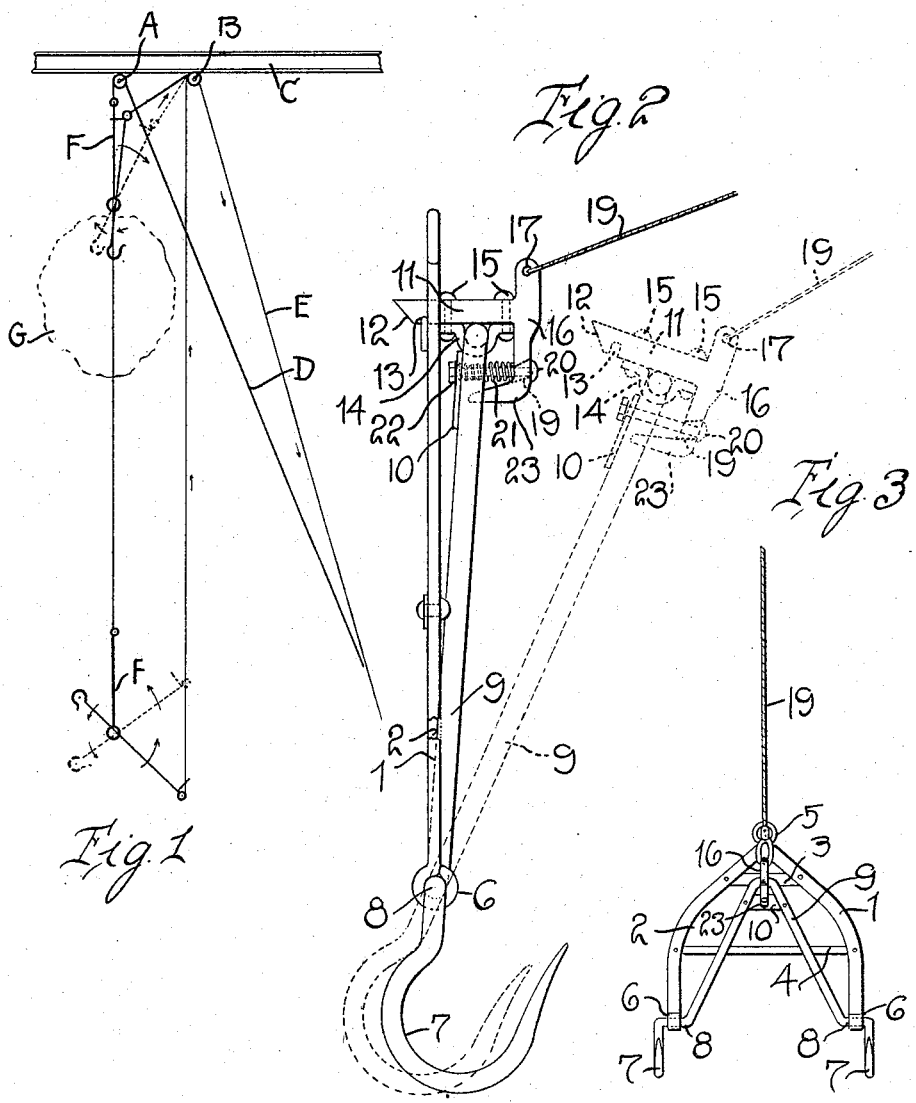

CYRUS N. CHAMBERS AND WILLIAM N. CHAMBERS, OF HAINES, OREGON.

HAY-HOOK.

1,202,029.  Specification of Letters Patent.  Patented Oct. 24, 1916.

Application filed May 22, 1915. Serial No. 29,803.

*To all whom it may concern:*

Be it known that we, CYRUS NEWTON CHAMBERS and WILLIAM NEWTON CHAMBERS, of Haines, in the county of Baker and State of Oregon, have invented certain new and useful Improvements in Hay-Hooks; and we do hereby declare the following to be a full, clear, and exact description of the invention, such as will enable others skilled in the art to which it appertains to make and use the same.

Our invention relates to an improved hook for raising hay, straw or the like, in bale form to storage lofts.

It is one object of our invention to provide a hook of the above-mentioned type in which the hook means is movable into article-carrying and article-releasing positions.

Another object of our invention is the provision of trip mechanism controlled from a remote point to regulate the movement of the hook means into and out of the above-named positions.

Still another object is the provision of a reinforced frame carrying said hook means and arranged to sustain the weight of any article carried by said hook means.

A still further object of our invention resides in the construction of a hay hook of the hereinabove specified type which is simple in operation, easy to manufacture, and may be made in sizes proper for handling one or more bales of hay, straw or the like.

In the accompanying drawings annexed hereto and forming a part of this specification, we have illustrated only one of the preferred embodiments of our invention, the hook illustrated being only for the purpose of describing our invention and not to be considered as limiting the scope of our patent.

Figure 1 illustrates diagrammatically the *modus operandi* of a hook constructed according to our invention. Fig. 2 illustrates the hook, in side elevation. Fig. 3 illustrates the hook in front elevation.

With particular reference to Figs. 2 and 3, the hook comprises a supporting frame consisting of the depending arms 1 and 2, suitably reinforced by upper and lower cross members 3 and 4, respectively, which are preferably riveted in position. The arms of the frame converge at the top and meet in an eye 5 suitably constructed for the purpose of attaching a haul rope. The lower end of each arm is bent as shown at 6 to support the hook means.

The hook means consists of the hooks 7 terminating in oppositely and inwardly extending lengths 8 which are journaled in the frame as shown at 6. It will be seen by this construction that any weight carried by the hooks 7 is sustained entirely by the frame. The lengths 8 are extended upwardly and inwardly to form an inverted V-shaped member 9, the apex of which is located adjacent the reinforcing cross-member 3 when the hook means is in the article-engaging position, as shown in Figs. 2 and 3. This member carries a cross-piece 10 spanning a point near its apex. At the apex, tripping mechanism is mounted which serves to hold the hook means in an article-engaging position.

The trip mechanism comprises a detent arm 11 inclined at its forward end, as shown at 12, so that upon engagement with the upper edge of the member 3 it will raise, and the notch 13 formed therein will engage the member 3 to hold said hook means. This arm is held in proper relation to the member 9 by a clip 14 secured in place by rivets 15. The other end of the detent arm terminates in a substantially L-shaped lever 16, the upper end of which is drilled at 17 to provide attaching means for an actuating rope 18. The lower end is drilled angularly at 19 to receive one end of a bolt 20 which carries a coil spring 21, and the opposite end of which is held in the cross-piece 3 by a nut 22. The coil spring 21 extends between cross-piece 10 and the lower end of lever 16.

The L-shaped lever 16 extends in a reverse position so that the horizontally extending leg 23, when the rope 19 is pulled to unlatch the hook mechanism, will abut against the member 10 to prevent the tripping mechanism from moving too far. When the rope 19 is released the detent 11, by means of the spring 21, will move to its normal position again.

In Fig. 1 we have illustrated diagrammatically the method of using our invention. Sheaves A and B are attached to a beam C, and over these run a haul rope D and a trip rope E for operating the detent. In the down position shown, the mechanism F is in the article-releasing position, whereas in the upper position the mechanism is in the article-carrying position. If, when the mechanism is in the last-named position and carries a bale of hay, straw or the like G, it is wished to release the same, the rope E is pulled in the direction indicated by the arrows parallel therewith. This will trip the detent 11 and will release the load carried by the hook means. In order to return the hook means to its normal article-carrying position, it is then only necessary to give the rope E a sharp jerk which will latch the detent 11 over the member 3, by reason of the inclined end 12 and notch 13 carried by the detent 11.

It is to be understood that while we have herein described a specific form of our invention, we do not wish to be limited thereto except in so far as the claim imports.

We claim:

In a hay hook, the combination with a bifurcated frame having reinforcing cross members, of a hook member comprising an inverted V-shaped member and depending hooks thereon pivotally carried on said frame intermediate of its ends, a detent carried on said hook means adapted to latch with said frame, a spring for normally holding said detent in latched position, an L-shaped lever for releasing said detent and limiting the movement thereof, means for suspending said frame, and mechanism actuated from a remote point to operate said detent and control the movement of said hook means, substantially as described.

In testimony whereof, we have signed this specification.

CYRUS N. CHAMBERS.
WILLIAM N. CHAMBERS.

Copies of this patent may be obtained for five cents each, by addressing the "Commissioner of Patents, Washington, D. C."